United States Patent [19]

Rösch et al.

[11] Patent Number: 4,896,409

[45] Date of Patent: Jan. 30, 1990

[54] METHOD OF PRODUCING A ROTATIONALLY-SYMMETRICAL HOUSING, IN PARTICULAR A VALVE HOUSING

[75] Inventors: Arne Rösch, Haldenwang; Horst Stade, Blaichach, both of Fed. Rep. of Germany

[73] Assignee: Robert Bosch GmbH, Stuttgart, Fed. Rep. of Germany

[21] Appl. No.: 800,500

[22] Filed: Nov. 21, 1985

[30] Foreign Application Priority Data

Jan. 24, 1985 [DE] Fed. Rep. of Germany ....... 3502287

[51] Int. Cl.$^4$ ............................................... B23P 15/26
[52] U.S. Cl. .................................. 29/157.1 R; 29/527.6
[58] Field of Search ................ 29/597, 527.6, 157.1 R

[56] References Cited

U.S. PATENT DOCUMENTS

| | | | |
|---|---|---|---|
| 2,153,173 | 4/1939 | Campbell | 29/527.6 |
| 2,696,658 | 12/1954 | Polard | 29/597 |
| 2,833,009 | 5/1958 | Horst | 29/527.6 |
| 2,834,095 | 5/1958 | Lazzopina et al. | 29/597 |
| 2,860,403 | 11/1958 | Meyer | 29/527.6 |
| 3,566,460 | 3/1971 | Yamaguchi | 29/597 |

Primary Examiner—Lowell A. Larson
Attorney, Agent, or Firm—Edwin E. Greigg

[57] ABSTRACT

The invention relates to a method for producing a rotationally-symmetrical, hollow-cylindrical housing having two magnetizable housing parts arranged to straddle a non-magnetic housing zone thereby isolating the housing parts magnetically. The housing is prefabricated, for the sake of simplified, more-economical manufacture, in one piece from a magnetizable blank except for an excess dimension in the outer diameter (d), and an annular groove which is cut into the inner wall of the housing to the width of the desired housing zone. With the housing rotating, a non-magnetizable filling material is introduced into the annular groove, the vicinity of the annular groove being heated during this process, and the rotation of the housing is continued until the filling material has set. Then the housing is turned down on the outside until the final dimension of the outer diameter (d) is attained and at which time there is then no further connection between the magnetizable parts.

4 Claims, 1 Drawing Sheet

U.S. Patent  Jan. 30, 1990  4,896,409 the two parts of the housing, that is, a bushing-shaped bottom part and an upper part forming a cover, are produced separately out of magnetizable steel blanks; then, with two spacer rings of austenitic steel, especially chrome-nickel steel, being disposed between them, the two parts are joined together by soldering on a connecting bushing of the same non-magnetic material. A copper solder is used to solder on the connecting bushing. For receiving the connecting bushing, a partial groove is machined into each housing part, so that the connecting bushing rests rather tightly in the housing jacket. After the connecting bushing has been soldered, the entire outer jacket of the valve housing is turned and brought to the desired final dimension.

METHOD OF PRODUCING A ROTATIONALLY-SYMMETRICAL HOUSING, IN PARTICULAR A VALVE HOUSING

BACKGROUND OF THE INVENTION

The invention relates to a method for producing a rotationally-symmetrical, at least partially hollow-cylindrical, housing or body, in particular a valve housing, as generically defined hereinafter.

Such valve housings are used particularly for magnetic valves in anti-skid brake systems (ABS) for motor vehicles.

In a known method for producing such a valve housing, the two parts of the housing, that is, a bushing-shaped bottom part and an upper part forming a cover, are produced separately out of magnetizable steel blanks; then, with two spacer rings of austenitic steel, especially chrome-nickel steel, being disposed between them, the two parts are joined together by soldering on a connecting bushing of the same non-magnetic material. A copper solder is used to solder on the connecting bushing. For receiving the connecting bushing, a partial groove is machined into each housing part, so that the connecting bushing rests rather tightly in the housing jacket. After the connecting bushing has been soldered, the entire outer jacket of the valve housing is turned and brought to the desired final dimension.

In this method, the two housing parts, the spacer rings and the connecting bushing must be manufactured highly accurately, with very small tolerances, and they must be assembled with virtually perfect alignment before soldering.

OBJECT AND SUMMARY OF THE INVENTION

The method according to the invention has the advantage that the housing is made from one piece. Fitting of separate parts to one another is unnecessary requiring less of an assembly operation and adjustment is not required. The production process thus becomes more favorable in terms of time as well as cost.

The soldered connection is reliable and homogeneous, because the non-magnetic filling material spreads out uniformly in the annular groove because of centrifugal force and becomes secure. Rotating the housing effects a compression of the material when the filling material is in the molten phase and prevents the material from flowing downward when the filling material is in the cooling-down phase. As filling material, a copper solder or a mixture of solder and austenitic steel, especially chrome-nickel steel, is used. If the annular groove area is suitably heated, the filling material is introduced in liquid form, that is, in its molten phase. It can also be introduced into the annular groove in solid form, however, for instance in the form of balls, chips, rings or the like. For heating the annular groove area, an induction coil or gas burner is suitable.

If a solder suitable for use as a bearing material is used as the filling material, then for certain types of magnetic valves, an economical external bearing for a magnetic armature can be attained merely by rotating the body whereby the solder fills the recess on the inner wall of the housing.

Advantageous further embodiments of and improvements to the method disclosed herein are attainable by means of the provisions narrated below.

One further advantageous embodiment of the invention is shown in FIG. 6. With this form of annular groove, a T-shaped soldering fillet is created, which enables more favorable anchoring of the solder; then the valve housing will be suitable for high-pressure valves as well.

The method according to the invention will be better understood and further objects and advantages thereof will become more apparent from the ensuing detailed description of preferred embodiments of a valve housing taken in conjunction with the drawings.

DESCRIPTION OF THE PREFERRED EMBODIMENTS

Figure 1:
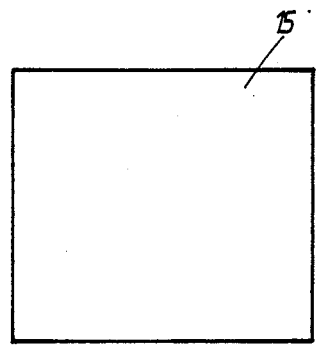
FIGS. 1-5 each show a longitudinal section taken through a valve housing at various successive stages of its manufacture.

The magnetic valve housing for anti-skid brake systems shown in FIGS. 1-5 at various stages in its manufacture is rotationally symmetrical in the final stage (shown in FIG. 5) and has a hollow-cylindrical, bushing-like upper housing part 10 and a lower housing part 11 forming a bottom; both these parts are made of magnetizable steel, such as Su 2614. The two magnetizable housing parts 10 and 11 are magnetically isolated from one another by an interposed recess or zone 12 of non-magnetic material, such as austenitic chrome-nickel steel or a mixture of copper solder and such a steel. The upper housing part 10 and part of the lower housing part 11 have an outer diameter the final dimension of which is designated d. The lower housing part 11 also has an annular flange 13 offstanding therefrom.

The method for producing the valve housing will now be explained, referring to the stages of manufacture shown in FIGS. 1-5.

Figure 2:
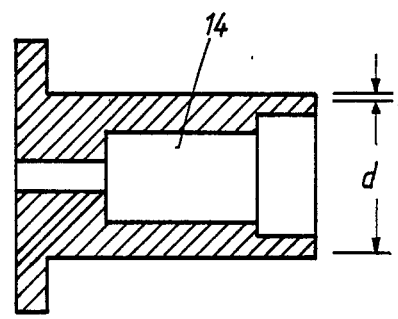

Beginning with an extrusion-molded blank or unfinished part 15 (FIG. 1) of magnetizable material, such as Su 2614, which has been cut into a working length and turned smooth on the end face to the final length of the housing, the housing is pre-turned from this blank 15 in one piece to such an extent that an inner stepped bore 14 having the final dimension, on the one hand, and on the other hand the outer shape of the housing except for an excess dimension d' of the outer diameter of the cylindrical housing part are completed (FIG. 2). However, it is also possible for the outer dimension of the hollow-cylindrical housing part to be already turned to the final dimension (diameter d), with the excess dimension d' left only in the vicinity of the non-magnetic recess or zone 12 that has not yet been provided.

Figure 3:
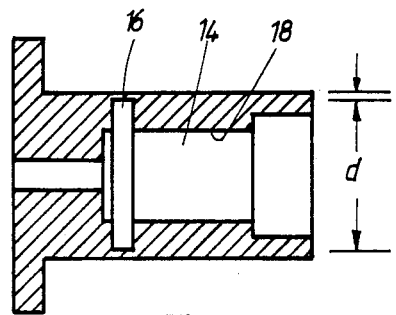
Figure 4:
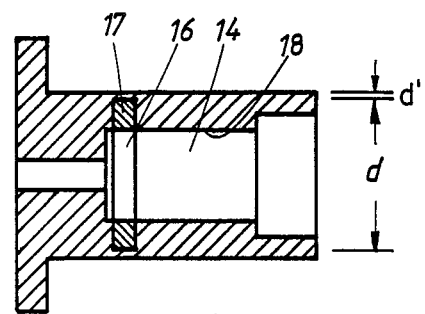

In the vicinity of the non-magnetic housing zone 12 that has not yet been provided, an annular groove 16 is cut into the inner wall 18 of the housing by an orbital cutter means or other suitable tool, the axial width of the cut corresponding to that of the desired non-magnetic housing zone 12 and its base circle diameter being equal to or greater than the final dimension of the outer diameter d (FIG. 3).

The thus-prefabricated housing is fastened onto a lathe apparatus and set to rotating. As the housing rotates, the annular groove 16 is filled with a non-magnetizable filling material 17, utilizing centrifugal force to accomplish this. As the filling material 17, a solder or a mixture of a solder and austenitic steel, such as chrome-nickel steel (V2A), is used. The filling material 17 is introduced into the annular groove 16 in liquid form, that is, in its molten phase. However, it can also be introduced into the annular groove 16 in the form of balls, chips or rings. At the same time, the housing is heated in the vicinity of the annular groove 16 by an induction coil or gas burner. The liquid filling material 17 fills out the annular groove 16 completely, and at the groove flanks it combines with the housing material. The heating operation is then stopped, and the filling material 17 cools down; centrifugal force prevents it from flowing downward during the cooling-down phase. Centrifugal force during the molten phase also causes a compression of the material making up the filling material 17 (see FIG. 4).

Figure 5:
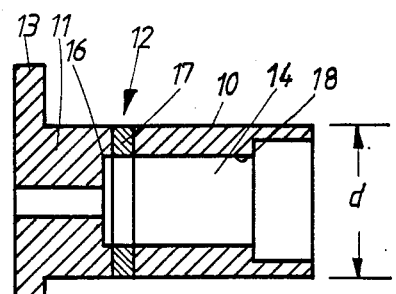

After cooling, the housing is machined on the outside until the final dimension of the outer diameter d is attained; during this process, the filling material 17 on the outer circumference of the housing is exposed [i.e. is in the open, not covered by anything] in the width of the non-magnetic housing zone 12 desired, and there is no further magnetizable connection between the upper housing part 10 and the lower housing part 11 (FIG. 5).

Figure 6:
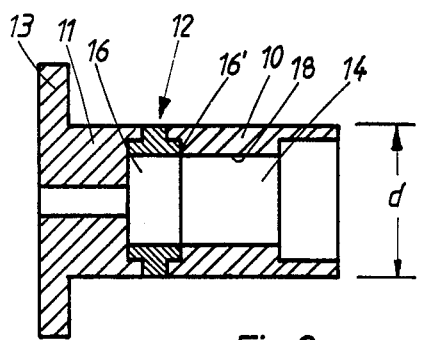
FIG. 6 is a longitudinal section taken through a completely finished valve housing according to a further exemplary embodiment.

The housing shown in its final state in FIG. 6 is manufactured in the same manner as that described above. The only difference is that the annular groove 16 is stepped in its embodiment and has a groove section 16' that widens toward the inner housing wall 18, that is, toward the stepped bore 14. As clearly shown in the drawing the annular groove apprioximates a T-shaped portion in cross-section where the horizontal portion of the T is greater in length than the vertical portion. By means of this stepped annular groove 16, better anchoring of the solder is attained, so that the housing is also suitable for use in high-pressure valves.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method of producing a hollow cylindrical body having two magnetizable body parts separated by a non-magnetic material from a piece of magnetizable stock comprising the steps of: machining said chylindrical body to produce a cylindrical outer wall of uniform diameter with a flange at one end thereof, forming an axial through bore in said body, said through bore having successively different diameters, machining an annular recess in said through bore in one of said diameters, heating said cylindrical body in an area of said annular recess while rotating the same, introducing a fluid filler of non-magnetizable material into said annular recess while continuing to rotate said body, cooling said body, and turning said outer wall of said cylindrical body to expose said non-magnetic filler material, thereby producing axially spaced magnetizable cylindrical body portions secured by a non-magnetizable cylindrical body portion of filler material having the same radial thickness as said axially spaced body portions secured to said filler material.

2. A method as defined in claim 1, in which said filler material is solder.

3. A method as defined in claim 2, in which said solder is combined with chrome-nickel steel.

4. A method as defined in claim 1, in which said annular recess is T-shaped in cross-section and further wherein a horizontal portion of said T-shaped recess is of greater length than a vertical portion thereof.

* * * * *